United States Patent Office 3,439,655
Patented Apr. 22, 1969

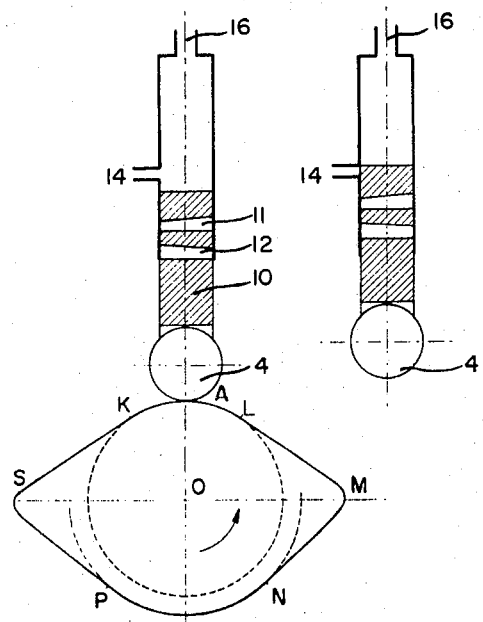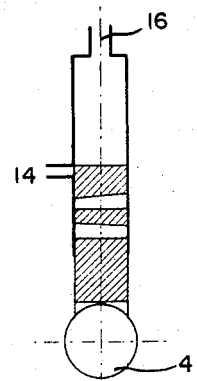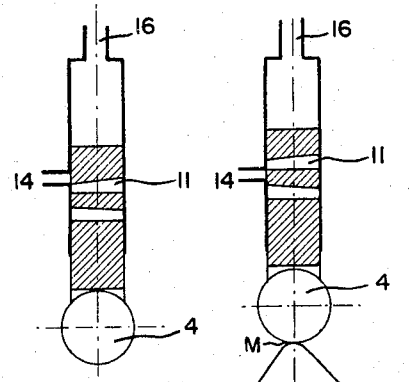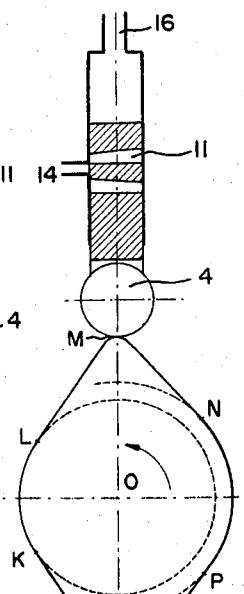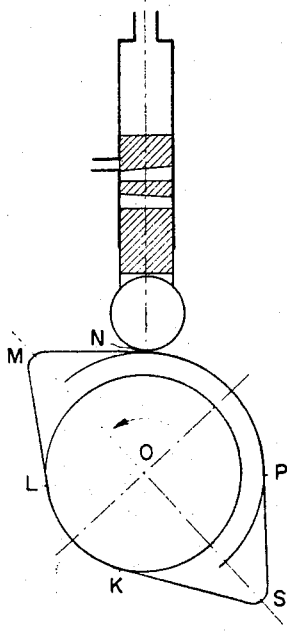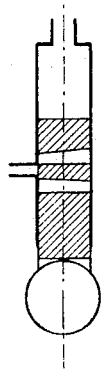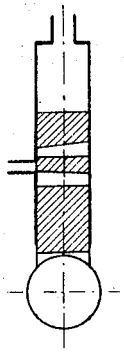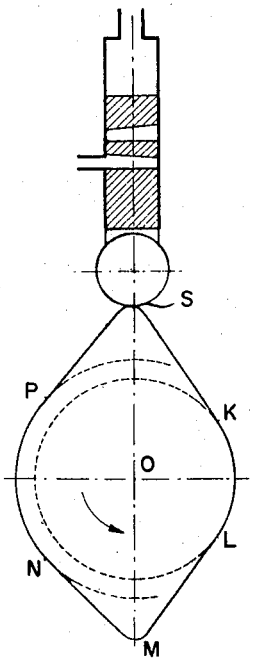

3,439,655
DOUBLE INJECTION APPARATUS FOR A
COMPRESSION IGNITION MOTOR
Pierre Eyzat, Vanves, France, assignor to Institut
Francais du Petrole des Carburants et Lubrifiants, Rueil Malmaison, France
Filed Nov. 1, 1966, Ser. No. 591,266
Claims priority, application France, Nov. 9, 1965,
37,871
Int. Cl. F02m 45/02
U.S. Cl. 123—32                            1 Claim

ABSTRACT OF THE DISCLOSURE

A principal and a secondary injection in each work cycle of a compression ignition motor at an interval of substantially half a cycle is attained by using a cam having two bosses of different radii actuating an injection pump. The pump has a cylinder with a lateral admission orifice in the wall thereof and the piston in the cylinder is actuated by the cam. Spaced first and second annular grooves in the piston connected to each other and to the space in the cylinder above the piston cooperate with the admission orifice and with the wall of the cylinder to provide an abrupt ending for the two injections. The boss on the cam corresponding to the secondary injection has a greater height than the height of the first boss.

---

The present invention has for an object apparatus for use with compression ignition motors to divide the combustible charge for each work cycle into two parts for injection into each cylinder as a principal injection and a secondary injection.

This apparatus comprises, in combination with the injector for each cylinder, a feed pump for the combustible mixture, in which the piston is displaced by rotation of a cam having two bosses which correspond, respectively, to the principal injection and to the secondary injection.

Double injection apparatus is already known comprising an injection pump in which the cylinder has a lateral admission orifice and the piston has an annular groove communicating with the space in the cylinder above the piston with the piston driven by a cam having two bosses providing the principal injection and the secondary injection. With the known cam as utilized in these known devices, termination of the principal injection is obtained when the annular groove passes the admission orifice of the pump at the end of the lift of the piston by the corresponding boss of the cam.

Known apparatus has certain inconveniences in not permitting a sufficiently rapid injection of small quantities of fuel in the secondary injection.

Since the portion of the fuel of the secondary injection is generally less in amount than that of the principal injection, the movement of the piston controlled by the corresponding boss of the cam should be less than for the principal injection.

Accordingly, the communication between the annular groove in the piston and the admission orifice of the pump cannot occur at the end of the secondary injection. The end of the secondary injection is only obtained when the top of the piston is returned into its initial position before the beginning of the principal injection at the level of the admission orifice.

It follows that between the beginning and the end of the secondary injection, the lift of the piston increases, passes through a maximum, and then decreases again to return to the level corresponding to the beginning of injection which involves a very long injection period.

However, a long injection period does not allow injection of a small quantity of fuel because the amplitude of the pressure waves is then insufficient at low motor speeds to actuate the injector. This results in irregular functioning with the secondary injection of a small quantity of fuel occurring only above a certain minimum speed.

Other double injection devices have been devised in which the piston of the pump is provided with a first annular groove for return to the low pressure of the pump cylinder after the principal injection and a second annular groove for return to low pressure after the secondary injection.

This second annular groove is more distant than the first groove from the face of the piston acting on the fuel in the cylinder of the pump.

A double bossed cam of the type used with a piston having two annular grooves is shown in broken lines in FIG. 1 of the drawings herewith.

While this type of cam gives satisfactory results for double injection apparatus associated with an injection pump in which the piston has two grooves, it has now been discovered that a substantially different form of the cam with two bosses associated with an injection pump having a piston with two annular grooves provides for injection of the same total charge of fuel with a smaller total stroke of the piston. Moreover this new type of cam reduces the maximum acceleration to which the piston of the pump is subjected during the injection cycle.

In double injection apparatus in accordance with the present invention utilizing two annular grooves on the piston of the injection pump the cam has two bosses having summits separated by an angular interval corresponding to the interval between the two injections, which in the example considered hereinafter, is an interval of 180° corresponding to an interval of a half-cycle between the principal injection and the secondary injection.

The profile of the cam comprises a portion of minimum radius which will be called a portion of the base circle. The radius of the cam at each point of its profile is defined as the distance of this point from the axis of rotation of the cam. Beginning with this portion and following the profile of the cam in the direction opposite to the rotation thereof, the profile shows:

(a) A substantially straight portion of increasing radius and tangential to the base circle and, connected to it, the rounded peak of a first boss corresponding to a lift of the piston sufficient to provide all of the first injection but less than that which is necessary to initiate the second injection, that is, a lift such that the lower level of the first annular groove, taken from the top of the piston, for a vertical position of the pump cylinder, is not above the upper level of the admission orifice of the pump.

(b) A substantially straight portion of decreasing radius connecting the rounded top of the first boss to a circular sector concentric with the base circle and of greater radius than that at which the top of the piston is at the upper level of the admission orifice.

(c) A substantially straight portion of increasing radius tangential to this circular sector and connecting it to the rounded top of a second boss having a radius a least equal to that at which the second annular groove of the piston (second groove from the top of the piston) opens communication with the admission orifice of the pump.

(d) A portion of decreasing radius connecting the top of the second boss to the base circle.

An embodiment of the present invention is shown, by way of example only, in the accompanying drawings and is described hereinafter to illustrate the invention.

In the accompanying drawings, FIG. 1 shows in solid line a cam in accordance with the present invention;

FIGS. 2A to 2H show successive positions taken by the piston of the injection pump during rotation of the cam of FIG. 1;

Figure 1:
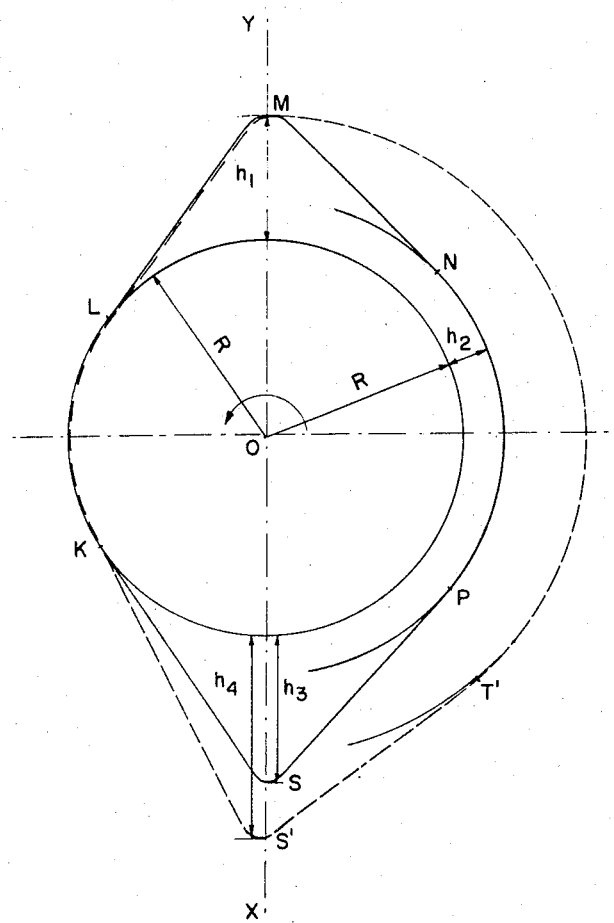

With reference now to the several figures, and as seen in FIG. 1, the cam of the present invention shown in solid line has a base circle of radius R, a center O and includes, as does the cam shown in broken lines two bosses controlling the principal injection and the secondary injection.

The peaks of these bosses M and S, respectively, are on the same diameter XY of the base circle, in this embodiment.

The distance of the top of boss S from the center O of the cam is less than that of the corresponding top S' of the cam shown in broken line.

Diameter XY divides the surface of the cam of the present invention into two parts S, K, L, M and M, N, P, S, respectively.

The first of these parts has a profile comparable to that of the cam shown in broken line.

This first part, has, successively, a substantially straight portion SK, an intermediate portion comprising the arc KL of the base circle and a new rectilinear portion LM, the two rectilinear portions SK and LM being, respectively, tangential at K and L to the base circle.

While the cam follower 4 (FIG. 2A) is located on portion KL of the cam, the direction of rotation being shown by the arrow, piston 10 is in a stationary position in which the admission orifice 14 is entirely opened by the piston.

Figure 3:
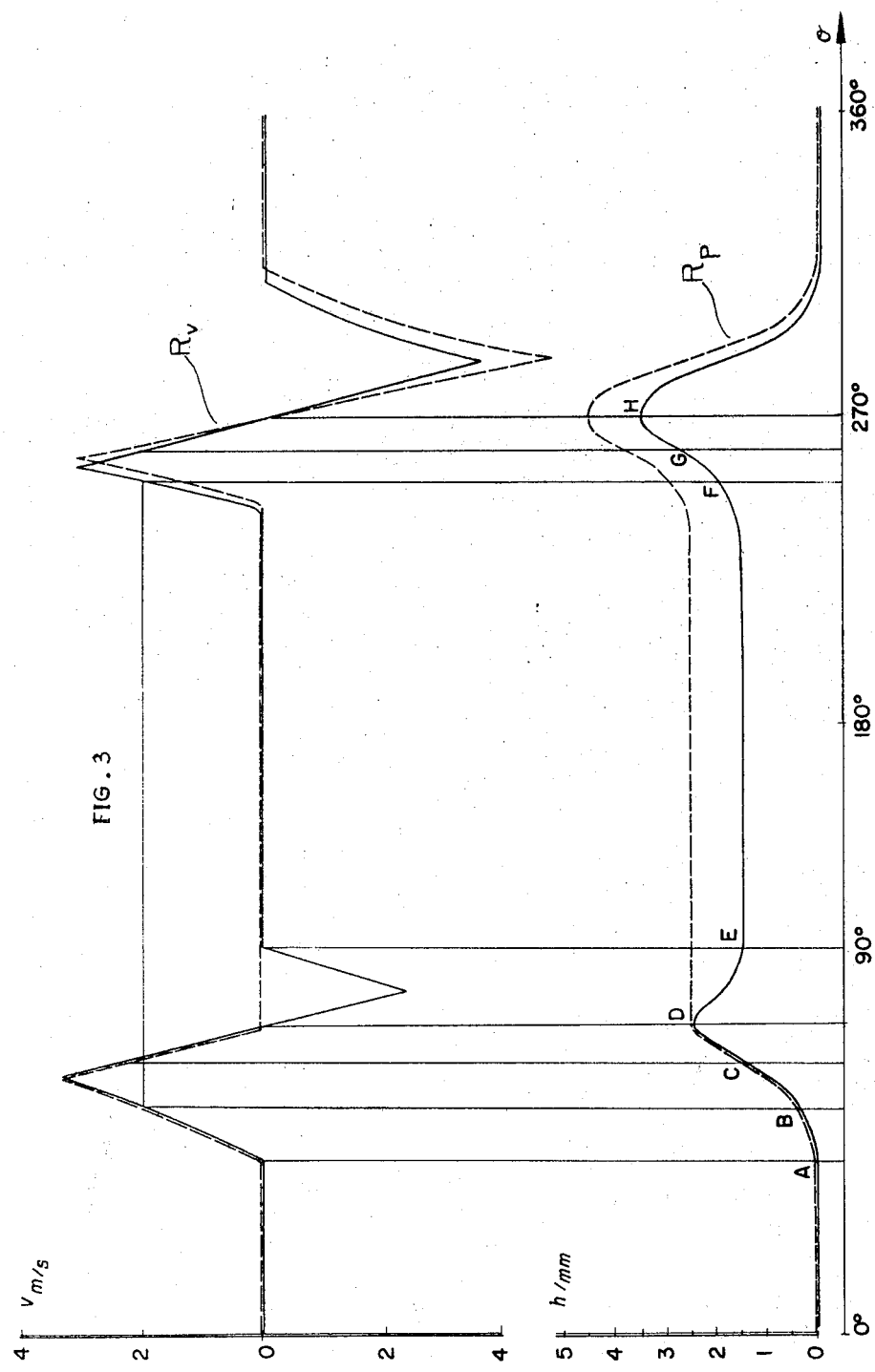
FIG. 3 is a representation of curves Rp and Rv showing, respectively, as a function of the angle of rotation of the cam, the displacements of the piston and the speed of the piston for the cam of FIG. 1 and, for purposes of comparison, for the cam shown in broken line in FIG. 1.
Figure 4:
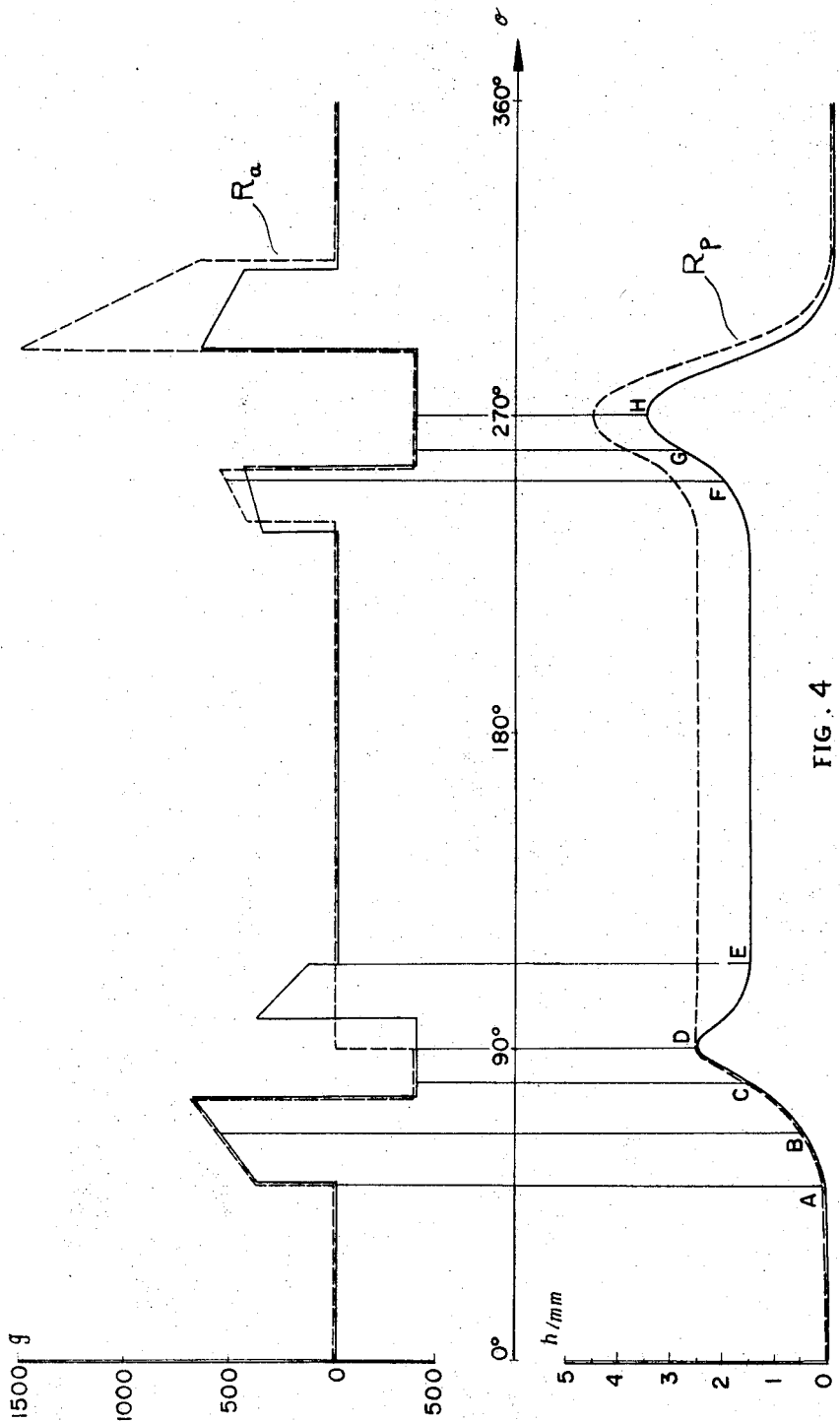
FIG. 4 shows curves Rp and Ra representing respectively, the displacements of the piston and its acceleration as a function of the angle of rotation of the cam of FIG. 1 and, for purposes of comparison, for the cam shown in broken line in FIG. 1.

This position is shown by the point A on curves Rp of FIGS. 3 and 4 showing the lift H in millimeters of piston 10 for each angular position θ° of the cam. The corresponding speed V of the piston (in meters per second) is shown by curve Rv of FIG. 3 and its acceleration by curve Ra of FIG. 4, taking as unity the acceleration g due to gravity and for a speed of rotation of the cam of 1500 revolutions per minute.

As the cam rotates, follower 4 passes over the straight portion LM which moves piston 10 toward the compression chamber 16. The piston then closes orifice 14 in the position shown in FIG. 2B which corresponds to point B on the curves Rp of FIGS. 3 and 4 and the principal injection then begins and continues until the piston reaches the position shown by FIG. 2C corresponding to point C on curves Rp of FIGS. 3 and 4 at which time the first groove 11 just opens into orifice 14 with return to the low feed pressure in the pump cylinder.

Return to low pressure is obtained by an internal bore in piston 10, or by a longitudinal groove on the periphery of the piston (not shown), which connects the two annular passages 11 and 12 with the part of the cylinder of the pump above the piston.

As the rotation of the cam continues, follower 4 reaches the top M of the first boss of the cam in the position shown in FIG. 2D corresponding to point D of curves Rp of FIGS. 3 and 4.

This is the position for the piston when the first annular groove 11 terminates communication with orifice 14. Then follower 4 passes over the second part of the profile of the cam and firstly over a substantially straight portion MN which corresponds to a movement in reverse of piston 10 to the piston shown in FIG. 2E, analogous to that of FIG. 2C, which corresponds to point E in FIGS. 3 and 4.

Follower 4 then travels on portion NP of the cam which has the form of an arc of a circle concentric with the base circle and tangent to portion MN, which corresponds to a stationary position of the piston, retaining the position of FIG. 2E.

Circular portion NP is followed by another substantially straight portion PS which corresponds to an upward movement of piston 10.

When piston 10 reaches the position shown in FIG. 2F, which corresponds to point F on the curves of FIGS. 3 and 4, the secondary injection occurs and lasts until the piston reaches the position shown in FIG. 2G, which corresponds to point G on FIGS. 3 and 4.

As the rotation of the cam continues, follower 4 reaches the top S of the second boss of the cam, which corresponds to the position of the piston shown in FIG. 2H, where the second annular groove 11 is in communication with admission orifice 14 (point H of FIGS. 3 and 4).

The piston then is lowered when the follower 4 travels over the substantially straight portion SK of the cam until it returns to the position of FIG. 2A.

The advantages of the type of cam utilized in apparatus of the present invention, as compared to the cam shown in broken line in FIG. 1 having the characteristics shown in broken line in FIGS. 3 and 4, derive from the fact that in practice and under given conditions each of the two injections should only begin when the piston has reached a sufficient velocity.

The secondary injection can then begin, after the instant of passage of follower 4 at the top M of the first boss of the cam corresponding to the position of the piston for which its velocity reduces to zero after the principal injection, only when the cam will have again transmitted to the piston a velocity corresponding substantially to that reached at point B of curve Rp (velocity at the beginning of the principal injection).

However, with the cam as shown in broken line in FIG. 1, the piston maintains its position as in FIG. 2D after the passage of the follower 4 at top M of the first boss of the cam.

Actually, as shown in FIG. 1, with the type of cam as shown in broken line, the follower then passes over a portion of the cam forming an arc of a circle concentric with the base circle of the cam.

With the cam as utilized in the apparatus for double injection in accordance with the present invention as shown in solid line, on the contrary, the piston descends (FIG. 2E) from its position of FIG. 2D, then returns allows it to repass (FIG. 2F) in the position of FIG. 2D with a velocity sufficient for the secondary injection to begin at once while, in the same position with the type of cam shown in broken line in FIG. 1, its velocity is zero.

It follows that the secondary injection can be obtained with a total lift $h_3$ of the piston (FIG. 1) which is less than the lift $h_4$ of the type of cam shown in broken line in FIG. 1.

An essential advantage of the cam of the present invention is that it permits, as is shown in FIG. 4, a substantial reduction of the maximum acceleration to which the piston is subjected during its injection cycle.

This then provides an important decrease in the wear on the cam at the point corresponding to the maximum acceleration of the piston.

Such wear, resulting in a progressive alteration of the profile of the cam at this point would prejudicially effect the efficient operation of the apparatus for double injection and the methods which were used heretofore in order to reduce this wear of the cam consisted in delicate and costly surface treatments applied to the profile of this cam.

Further, substantial reduction of the maximum acceleration of the piston in its cycle of injection obtained by use of the cam of the present invention eliminates marking of the profile of the cam and the corresponding point which would again increase the maximum acceleration of the piston and would lead to breakage of the cam and piston.

Another favorable result of the decrease of maximum acceleration to which the piston is subjected is to make possible a lightening of the construction of the double injection apparatus since the dimensions of the several parts of the apparatus are based upon this maximum acceleration. This added to the reduction of the total travel of the piston obtained with the cam of the present invention enables the size of the apparatus to be decreased.

Changes in or modifications to the above-described illustrative embodiment of the present invention may now be suggested to those skilled in the art without departing from the present inventive concept. Reference should therefore be had to the appended claim to determine the scope of this invention.

What I claim is:

1. Apparatus for providing two injections of fuel consisting of a principal injection and a secondary injection in each work cycle of a compression ignition motor, said injections being effected at an interval of substantially half a cycle from each other in the work cycle comprising a cam, two bosses of different radii on said cam, an injection pump, a cylinder of said pump, a lateral admission orifice in said cylinder, a piston in said cylinder actuated by said cam, said two bosses lifting said piston so as to respectively effect said principal and secondary injections, spaced first and second annular grooves in said piston connected to each other and to the space in the cylinder above said piston, cooperating with said admission orifice and with the wall of said cylinder so as to provide an abrupt ending for said two injections respectively, said second groove being spaced farther from the top of the piston than the first of said grooves, said cam having a profile including a circular portion of minimum radius constituting a portion of the base circle located between the first of said bosses corresponding to the principal injection and the second of said bosses corresponding to the secondary injection, said second boss corresponding to the secondary injection having a greater height than the height of said first boss, the profile of said cam further including from said first boss towards said second boss when followed in a direction inverse to the direction of rotation of said cam, a first substantially straight portion of decreasing radius, then a circular portion concentric to the base circle and having a radius at least equal to that at which the top of said piston begins to uncover said admission orifice when moving toward the bottom of the cylinder and then a second substantially straight portion of increasing radius, tangentially connected to the last-named circular portion and to the top of said second boss.

References Cited

UNITED STATES PATENTS 2,871,796  2/1959  Dreisen et al. _____ 103—154
2,960,079  11/1960  Monnot et al. _____ 123—32

LAURENCE M. GOODRIDGE, *Primary Examiner.*

U.S. Cl. X.R.

103—2; 123—139